(12) United States Patent
Hier et al.

(10) Patent No.: US 6,392,147 B1
(45) Date of Patent: May 21, 2002

(54) PROTECTOR THAT SNAPS OVER ROUTED PARTS

(75) Inventors: Michael J. Hier, Royal Oak; Robert P. Vitali, Sterling Heights; Robert Matejek, Oakland; Darin Daugard, Howell, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/497,072

(22) Filed: Feb. 2, 2000

Related U.S. Application Data

(60) Provisional application No. 60/118,395, filed on Feb. 2, 1999.

(51) Int. Cl.[7] .................................................. H02G 3/00
(52) U.S. Cl. .................... 174/70 C; 174/72 A; 174/135
(58) Field of Search ............................ 174/70 C, 72 A, 174/72 R, 72 C, 96, 97, 98, 117 A, 135, 138 E, 138 G, 189, 68.3, 40 CC; 191/22 R, 23 R; 248/68.1

(56) References Cited

U.S. PATENT DOCUMENTS

| | | | | |
|---|---|---|---|---|
| 423,449 A | * | 3/1890 | Seely | 174/68.3 |
| 460,725 A | * | 10/1891 | Markle | 174/68.3 |
| 2,332,374 A | | 10/1943 | Fagan | |
| 2,595,452 A | * | 5/1952 | Geist et al. | 174/97 |
| 2,831,049 A | * | 4/1958 | Cabral | 174/68.3 |
| 2,997,531 A | | 8/1961 | Oldham et al. | |
| 3,029,303 A | * | 4/1962 | Severino | 174/68.3 |
| 3,653,121 A | * | 4/1972 | Moriyama et al. | 174/70 C |
| 4,404,425 A | * | 9/1983 | Rich | 174/70 C |
| 4,494,520 A | | 1/1985 | Hurwitz | |
| 4,771,743 A | * | 9/1988 | McDowell | 174/72 A |
| 4,840,333 A | | 6/1989 | Nakayama | |
| 4,881,705 A | | 11/1989 | Kraus | |
| 4,910,362 A | * | 3/1990 | Kinner | 174/135 |
| 5,006,960 A | | 4/1991 | Kallin | |
| 5,171,155 A | | 12/1992 | Mendoza | |
| 5,463,189 A | | 10/1995 | Deneke et al. | |
| 5,469,844 A | | 11/1995 | Rogler | |
| 5,626,316 A | | 5/1997 | Smigel | |
| 5,677,513 A | | 10/1997 | Ito et al. | |
| 5,747,566 A | | 5/1998 | Sato | |
| 5,747,731 A | | 5/1998 | LaCasse | |
| 5,824,954 A | | 10/1998 | Biche et al. | |
| 5,929,381 A | * | 7/1999 | Daoud | 174/72 A |
| 6,051,790 A | * | 4/2000 | Takeuchi et al. | 174/72 A |

FOREIGN PATENT DOCUMENTS

| | | |
|---|---|---|
| DE | 41 41 689 A | 6/1993 |
| DE | 43 26 869 A | 1/1995 |
| EP | 418882 A | 3/1991 |
| FR | 2668569 A | 4/1992 |

* cited by examiner

*Primary Examiner*—Dean A. Reichard
*Assistant Examiner*—Adolfo Nino
(74) *Attorney, Agent, or Firm*—MacMillan, Sobanski & Todd, LLC

(57) ABSTRACT

A routed part protector for protecting cables, wires, hoses, tubing and the like having a closed slot extending to a central aperture for inserting routed parts to be maintained in the aperture forming an assembly. The assembly can be attached to a vehicle trim panel by double-sided tape or other mechanical means or inserted into a ditch in a vehicle floorboard. The protector has a trapezoidal cross section body whereby the side walls can be deformed to open the slot to permit the routed parts to pass through when assembling the protector to a wire harness. The tape or the ditch then prevents the slot from opening.

19 Claims, 5 Drawing Sheets

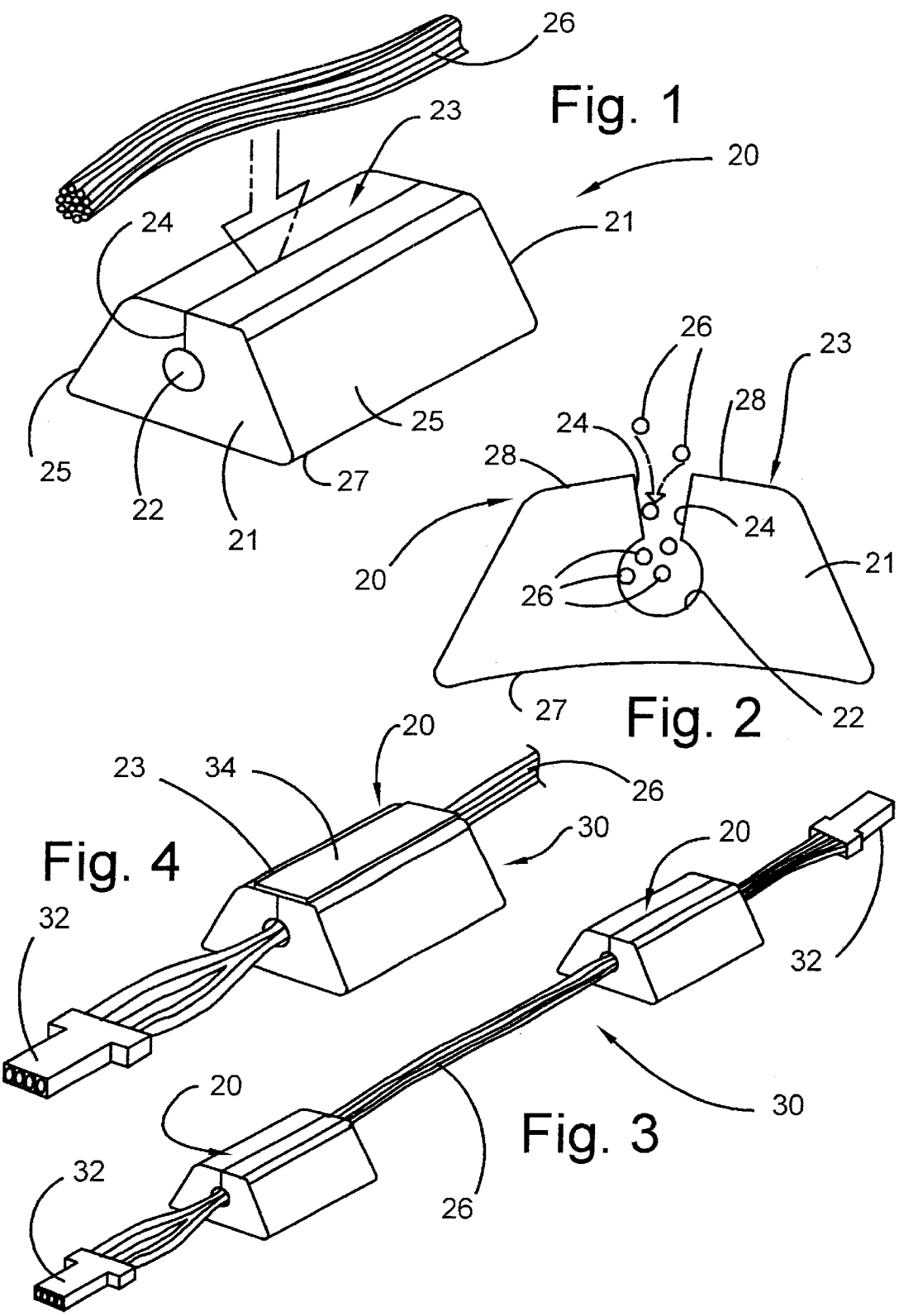

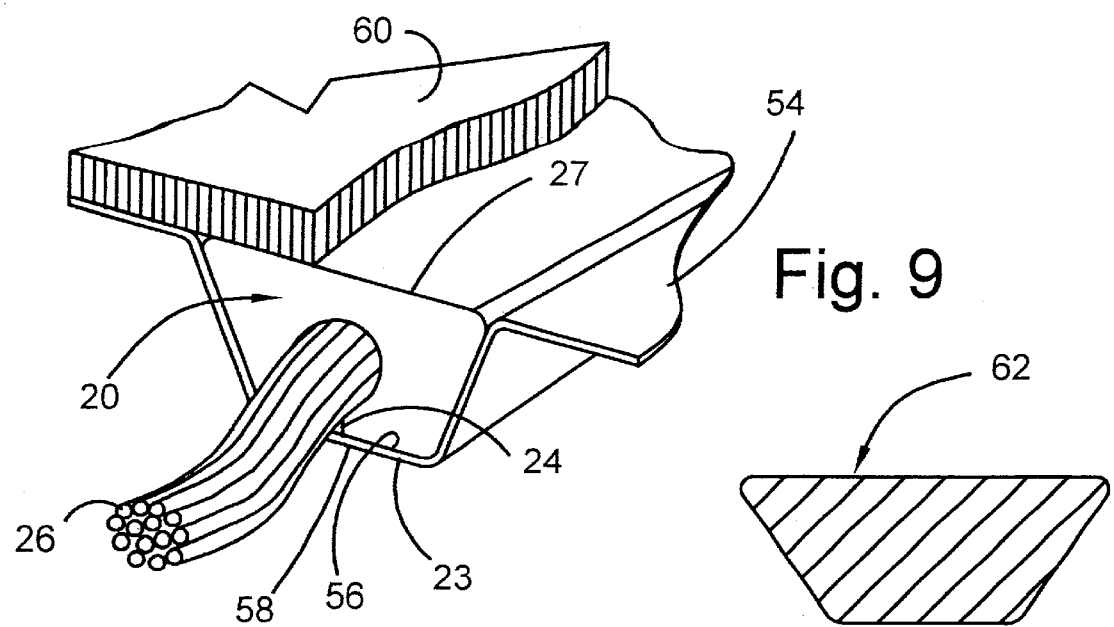
Fig. 9
Fig. 11
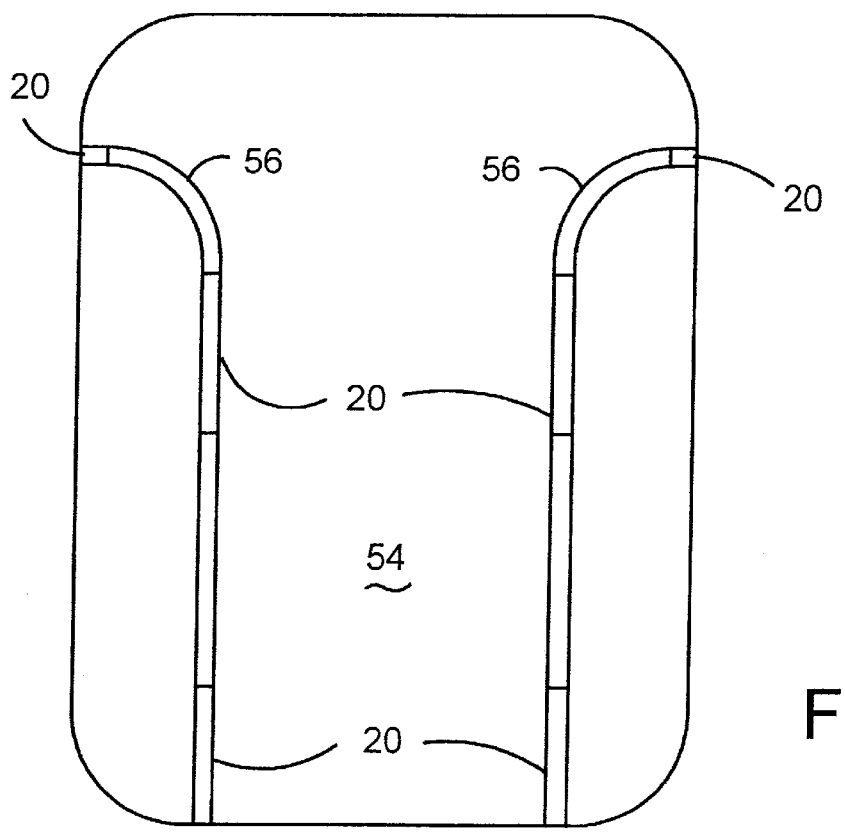
Fig. 10

PROTECTOR THAT SNAPS OVER ROUTED PARTS

CROSS-REFERENCE TO RELATED APPLICATION

This application claims the benefit of U.S. provisional patent application serial No. 60/118,395 filed Feb. 2, 1999.

BACKGROUND OF THE INVENTION

This invention relates to a wire harness protector that facilitates the mounting of wire harnesses into vehicle applications.

Wires harnesses are utilized in many vehicle applications to route a plurality of wires between various locations. Typically, wire harnesses have required complex assembly steps to position the wires at different locations and provide communication to and from various electrical components. This has sometimes resulted in undesirable buzz, squeak and rattle conditions.

Typically, wire harnesses have been snapped to vehicle trim panels after the assembly of the wire harness. This has proven somewhat complex, as the trim panel must be formed with wire harness holding structure. The wire harness is assembled at a distinct location shipped to the trim manufacturer, and then mounted to the trim panel.

It has sometimes been difficult to route wire harnesses, hoses, tubing, cables, or other routed parts at various locations within a vehicle, and yet still protect the parts. One example would be in the vehicle floorboard. The wire harness must typically extend beneath the carpet, and still be protected from damage caused by people walking on the carpet.

The present invention provides a simple apparatus that facilitates the mounting of wire harnesses to vehicle, and also protects the wire harnesses in many challenging environments.

SUMMARY OF THE INVENTION

The present invention concerns a wire harness protector for receiving a plurality of wires in a central aperture. A slot extends to the aperture from an outer surface of the protector body. The slot allows passage of a plurality of wires into the aperture when the slot is biased to an open position. However, the slot is normally biased to a closed position in a relaxed state that prevents movement of the wire harness out of the aperture. Thus, the wire harness protector may be utilized to receive a plurality of wires, and hold the wires. The wire harness protector protects the wire harness once the wire harness is received within the aperture.

The wire harness protector is preferably generally trapezoidal in cross section, with a smaller surface adjacent to the slot and a larger opposed surface. In One embodiment, the aperture has a major diameter and a minor diameter with the major diameter being greater than the minor diameter. Preferably, the major diameter extends perpendicular to the slot. This embodiment is particularly useful in reducing the height of a wire harness, as would be desirable when there is less available distance in one direction than there is in an opposed direction. In a sense, the aperture flattens the wire harness to better use available space.

In another feature of the present invention, the wire harness protector facilitates the attachment of the wire harness to trim panels. As an example, the wire harness protector may be provided with double-sided tape on one surface that secures the protector to the trim panel. The wire harness is secured to the protector, and thus is attached to the trim panel.

In one method according to this invention, the wire harness is assembled by moving the wires through the slot in the wire harness protector and into the aperture. Once the wire harness has been assembled into the wire harness protector, the assembly is then placed upon the trim panel. In this way, the separate steps of assembling the wire harness and then attaching the wire harness to the trim panel may be reduced.

In an alternative embodiment, the wire harness protector is secured to the trim panel, and a preassembled wire harness is then inserted through the slot and into the aperture. In a third possible embodiment, the wires could be individually assembled onto the trim panel after the protectors have been attached to the trim panel.

In another feature of this invention, a vehicle floorboard is provided with ditches to route wire harnesses, hoses, tubing, cables, or other routed parts between two locations. The ditches also preferably receive the wire harness connector with the wire harness retained in the central aperture. Preferably, the wire harness protector is positioned within the ditch such that the bottom wall of the ditch closes off the slot, thus preventing the wire harness from moving outwardly of the slot. The trapezoid shape allows positive routing with no variance in the direction that is perpendicular to the ditch. The soft covering suppresses buzz, squeak and rattle problems. Routing beneath the surface provides a safe environment, preventing damage to wiring from trim screws, seat mounts and other attaching hardware.

In other features of this invention, a secondary aperture and secondary slot are formed in the wire harness protector. This proves particularly valuable when an aftermarket wire is to be inserted into the vehicle. As an example, in the above-discussed embodiment wherein the wire harness is mounted into a vehicle floorboard, it may sometimes be necessary to mount additional wires such as when adding additional speakers, remote CD changer, or trailer tow by the original equipment manufacturer, dealership or vehicle owner. The secondary apertures are easily accessible to the assembler, and facilitate receipt and protection of the aftermarket wires for this additional wiring and function.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view showing the assembly of a wire harness into a wire harness protector in accordance with the present invention;

FIG. 2 shows a subsequent step in the assembly of the harness and protector of FIG. 1;

FIG. 3 shows the assembled wire harness and protector;.

FIG. 4 shows a subsequent step in the assembly;

FIG. 9 shows another attachment of the wire harness assembly to a vehicle;

FIG. 10 is a top plan view of vehicle floor;

FIG. 11 shows a third alternative protector;

DESCRIPTION OF THE PREFERRED EMBODIMENT

Figure 5:
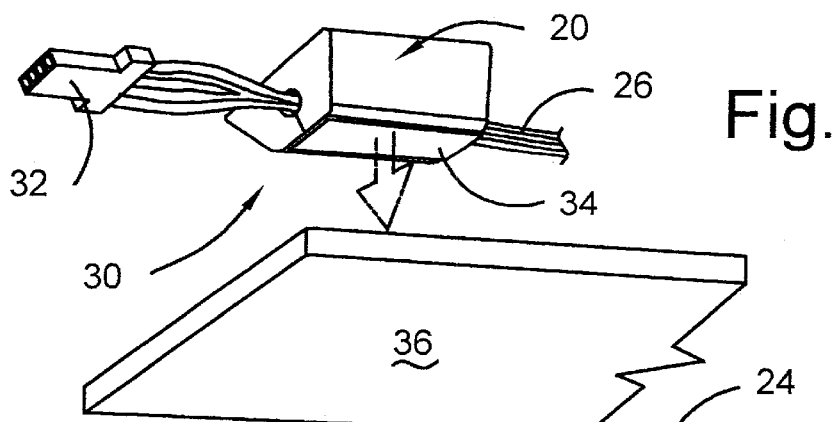
FIG. 5 shows the attachment of the wire harness assembly to a trim panel.

FIG. 1 shows a routed part protector 20 having a central aperture 22 extending between end surfaces 21 and a slot 24 extending from a top surface 23 into the aperture 22. The protector 20 can be formed of a foam or other compliant material, but is preferably formed of (EPDM) Ethylene Propylene Diene Monomer or similar rubber. Although the wire harness protector 20 is disclosed to protect wires in the preferred embodiment, use thereof to protect any routed part such as cables, hoses, tubing is within the scope and breath of the present invention. The wire harness protector 20 has a body of preferably generally trapezoidal cross-sectional shape with side walls 25 extending outwardly from the top surface 23 to an opposed bottom surface 27. Since a width of the top surface 23 is smaller than a width of the bottom surface 27, this facilitates the bending of the rubber protector 20 to expand the slot 24 to allow entry of a plurality of wires 26. As shown in FIG. 2, when portions 28 of the top surface 23 of the protector 20 are pivoted apart such that a width of the slot 24 expands, the wires 26 may be inserted into the aperture 22. In a relaxed state, the portions spring back together and the slot 24 is closed such as shown in FIG. 1.

By utilizing this invention, the wire harness can be assembled into the protector 20 initially. The wires 26 are inserted into the slot 24 and, when complete, the subassembly resembles that shown in FIG. 3. Connectors 32 are typically connected at each end of the wires 26 to make a wire harness assembly 30, and one or more of the protectors 20 also facilitate the attachment of the wire harness assembly 30 to a vehicle, as will be described below.

As shown in FIG. 4, a strip of single-sided or double-sided tape 34 may be placed on the protectors 20. The double-sided tape 34 is shown closing off the slot 24 by being installed on the top surface 23. Now, the wires 26 are received within the protector, and cannot move outwardly of the slots 24. Single-sided tape can be used simply for closing off the slot 24.

As shown in FIG. 5, the routed part assembly 30 is now placed onto a vehicle panel such as a trim panel 36 by utilizing the double-sided tape 34. Of course, other attachment methods may be utilized. The present invention thus facilitates the attachment of a wire harness or other routed part onto a trim panel, but does not require any separate attachment structure to be formed onto the trim panel. In addition, the wire harness and protector can be assembled in a single location and then simply attached to the trim panel. These are significant improvements in the assembly and cost of wire harness and trim panel assemblies.

Figure 6:
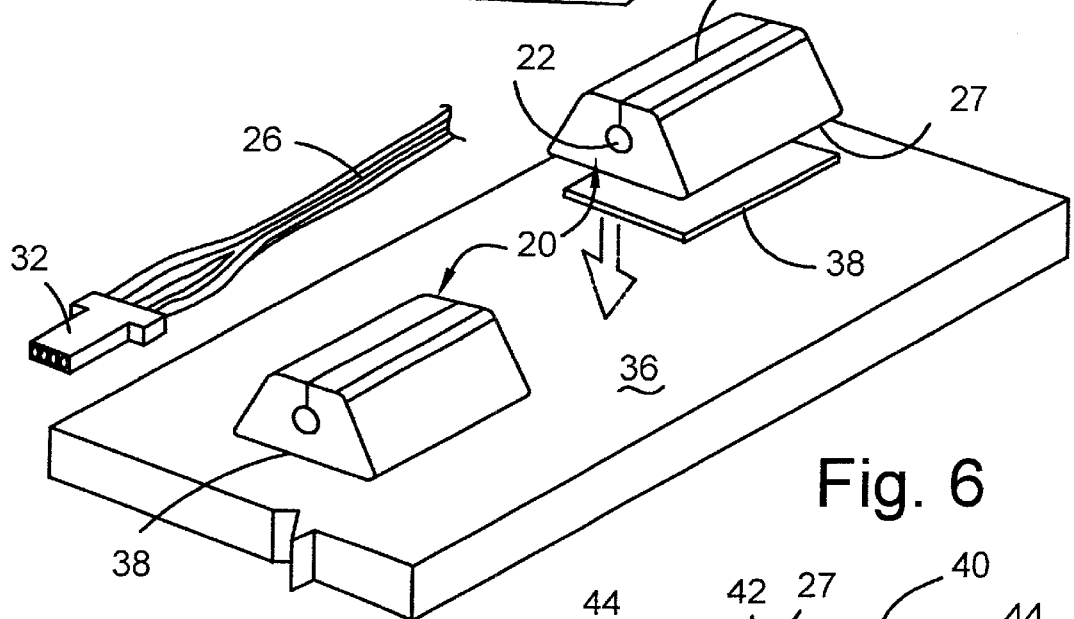
FIG. 6 shows an alternative method of attachment.

FIG. 6 shows an alternative embodiment wherein the protectors 20 are initially placed onto the trim panel 36, such as by double-sided tape 38. In this embodiment, the double-sided tape 38 is placed on the bottom surface 27 remote from the slot 24. Now, the slot 24 is still capable of being opened after the protector 20 has been assembled onto the trim panel 36. The wires 26 may now be inserted through the slots 24 into the apertures 22, and thus secured to the protectors 20, and to the trim panel 36. Again, this simplifies the assembly of a wire harness or other routed part onto a trim panel over the prior art.

Figures 7, 8:
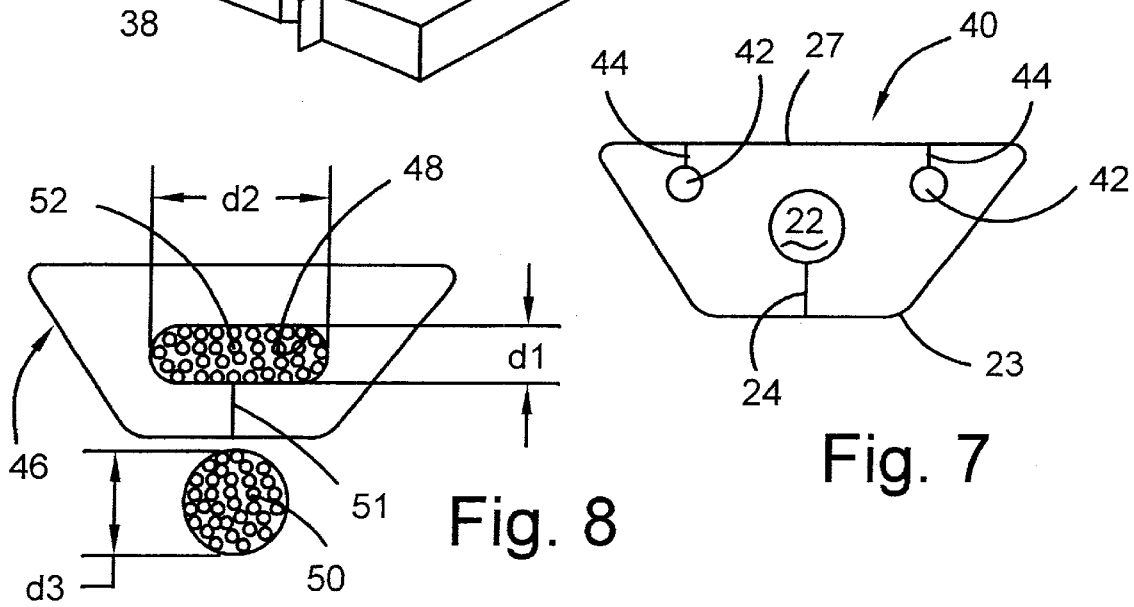
FIG. 7 shows a first alternative protector.
FIG. 8 shows a second alternative protector.

FIG. 7 shows an alternative embodiment protector 40 wherein there are secondary apertures 42 formed adjacent to and secondary slots 44 extending from the bottom surface 27. When the protector 40 is attached to a trim panel with the top surface 23 abutting the trim panel, the secondary apertures 42 and slots 44 will allow the attachment of subsequent wires, such as aftermarket wires. The wires may be moved through the slots 44 into the apertures 42 as in the above embodiments.

FIG. 8 shows another embodiment protector 46, which is provided with an aperture 48 having a minor diameter "d1" and a major diameter "d2". As can be appreciated, the major diameter "d2" is much greater than the minor diameter "d1". A plurality of wires 50 has a relaxed generally cylindrical diameter "d3". The bundle of wires 50 is inserted through a slot 51 and into the aperture 48. As shown, once the protector 46 has closed the slot 51, the bundle of wires 50 is squeezed to a new generally oval shape 52. The oval shape 52 is such that the bundle of wires no longer has the diameter "d3" in the "d1" minor diameter direction of the aperture 48. However, the bundle of wires has a diameter that is greater than "d3" in the major diameter "d2" direction. This embodiment is particularly useful in applications that are particularly space sensitive in one dimension, but not in the other. That is, if only a small amount of space is available in the minor diameter direction, this invention will allow the use of the wire harness protector and wire harness assembly in such a way that the wire bundle is reduced in size in the minor diameter permitting the best use of the small amount of available space.

FIG. 9 shows another embodiment wherein a vehicle panel such as a floor board 54 has a downwardly extending ditch 56 formed therein. The wire harness protector 20 is shown installed with the top surface 23 and the slot 24 abutting a bottom wall 58 of the ditch 56. The bottom surface 27 of the protector 20 underlies carpeting 60, such as typically found covering a vehicle floor. The protector 20 thus provides support to the carpeting 60, and protects the wires 26 or other routed parts as received within the protector 20.

FIG. 10 is a top view of a vehicle incorporating this aspect of the invention. As shown, the floorboard 54 has two ditches 56 receiving a plurality of the protectors 20. The wires (not shown) thus extend through the ditches 56 and through the spaced wire harness protectors 20. The protectors 20 are preferably located in locations where there is likely to be the application of an occupant's foot or cargo which might otherwise damage the routed part assembly 30.

FIG. 11 shows yet another feature of the present invention. In some applications, it may not be necessary to have the wires in both of the ditches 56. As an example, a vehicle may be prepared such that it can be easily modified for either right hand or left hand driving applications. Such a vehicle might not need wires in one of the two ditches dependent upon the application.

FIG. 11 shows another embodiment wire harness protector 62 having a solid body that will provide the support to the carpet, occupant's feet, and cargo but does not have an aperture for receipt of the bundle of wires.

Figure 12:
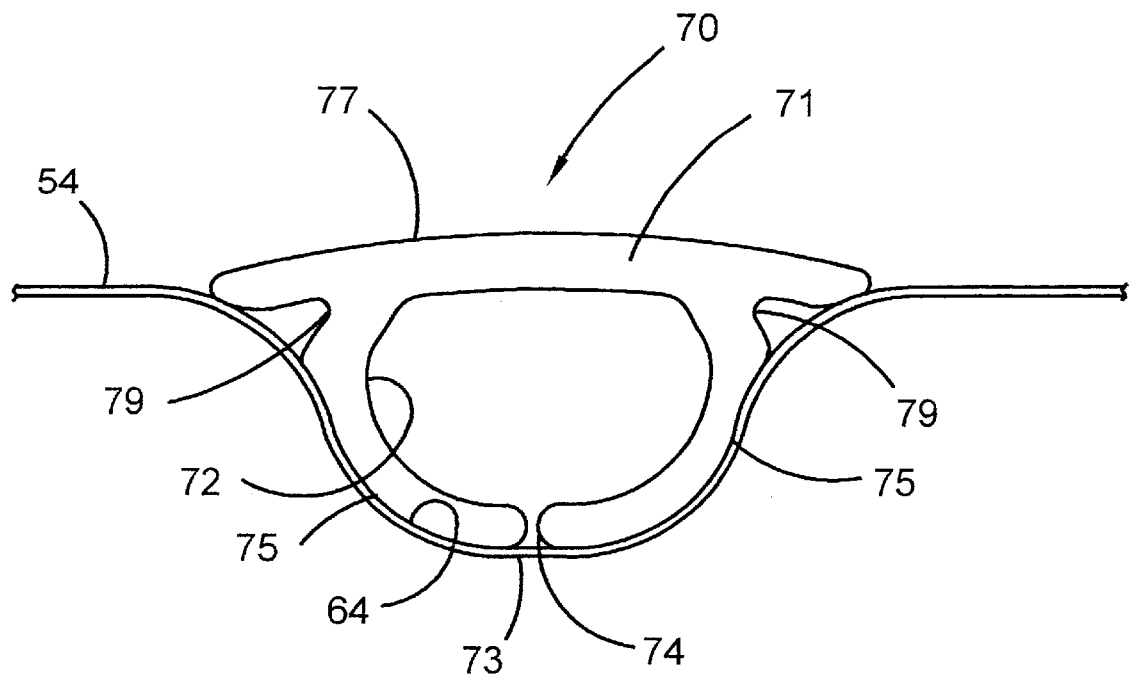
FIG. 12 shows a fourth alternative protector.

FIG. 12 shows another alternative routed part protector 70 having a central aperture 72 extending between end surfaces 71 and a slot 74 extending from a top surface 73 into the aperture 72. The protector 70 has a body of preferably generally trapezoidal cross-sectional shape with side walls 75 extending outwardly from the top surface 73 to an opposed bottom surface 77. The protector 70 is inverted in a ditch 64 formed in the vehicle floorboard 54. The ditch 64 has rounded contours in contrast to the ditch 56 shown in the FIG. 9. The body of the protector 70 is similarly rounded. A pair of notches or grooves 79 are formed in the side walls 75 adjacent the bottom surface 77 and extend generally parallel to the central aperture 72 between the end walls 71. The grooves 79 facilitate the manual outward bending of the side walls 75 during insertion of wires (not shown) through the slot 74 and into the aperture 72 by providing an easily graspable formation. As shown, the cross-sectional area of the central aperture 72 is maximized.

Figure 13:
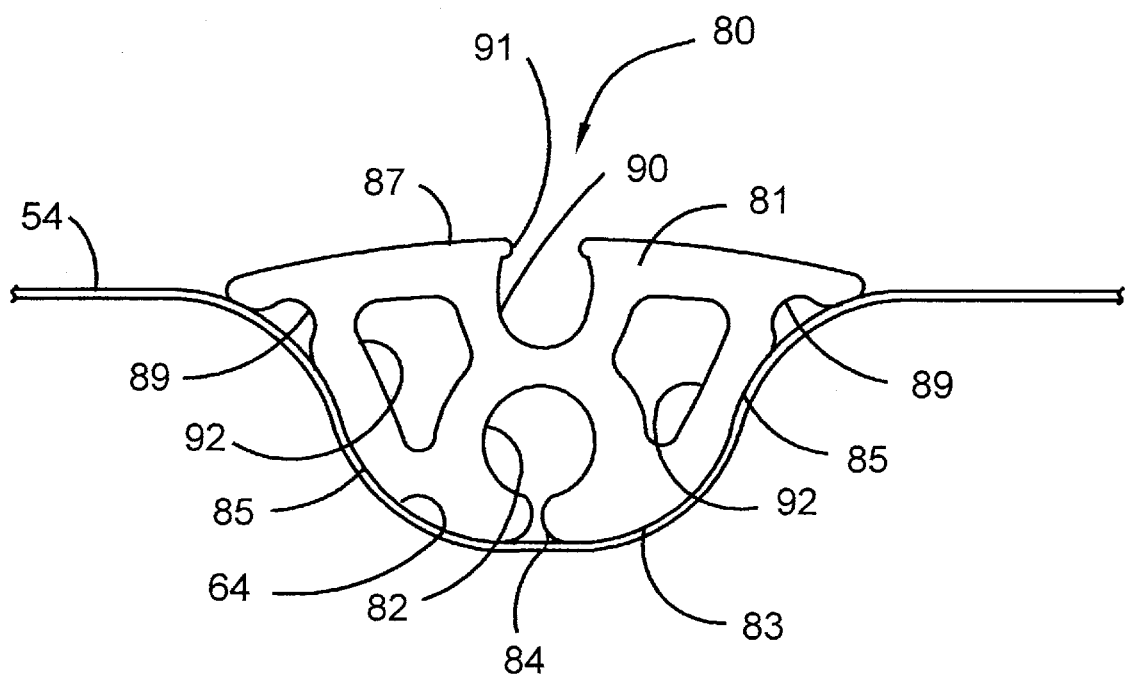
FIG. 13 shows a fifth alternative protector.

FIG. 13 shows yet another embodiment protector 80 similar in exterior shape to the protector 70 shown in FIG. 12. The protector 80 has a smaller cross-sectional area central aperture 82 extending between end surfaces 81 and a slot 84 extending from a top surface 83 into the aperture 82. The protector 80 has a body with side walls 85 extending outwardly from the top surface 83 to an opposed bottom surface 87 and is shown inverted in the ditch 64 formed in the vehicle floor board 54. A pair of notches or grooves 89 are formed in the side walls 85 adjacent the bottom surface 87 and extend generally parallel to the central aperture 82 between the end walls 81 to facilitate the outward bending of the side walls 85 during insertion of wires (not shown) through the slot 84 and into the aperture 82. A secondary aperture 90 is formed in the body extending generally parallel to the aperture 82 and being open to the bottom surface 87 through a secondary slot 91. Also formed in the body of the protector 80 are two voids 92 extending between the end walls 81 on either side of and generally parallel to the apertures 82 and 90. The voids 92 facilitate the bending of the side walls 85 during insertion of the wires (not shown) and reduce the amount of material required to form the protector.

Figure 14:
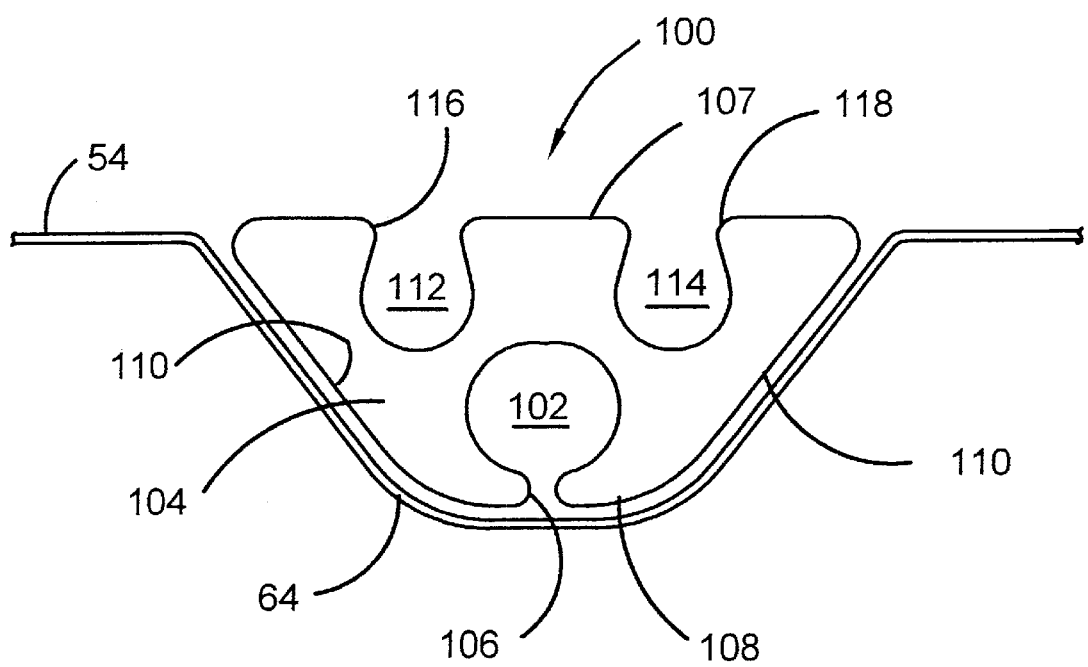
FIG. 14 shows a sixth alternative protector.

FIG. 14 shows an additional embodiment of the protector 100 of the present invention. Protector 100 has a central aperture 102 extending between end surfaces 104 and a slot 106 extending from a top surface 108 into the aperture 102. Protector 100 has a body of preferably generally trapezoidal cross-sectional shape with side walls 110 extending outwardly from the top surfaced 108 to an opposed bottom surface 107. The protector is inverted in a ditch 64 formed in the vehicle floor 54. A first and second secondary aperture 112 and 114 is formed in the body extending generally parallel to aperture 102 and being open to the bottom surface 107 through a first and second secondary slot 116 and 118. It should be appreciated that forming secondary slots 116 and 118 in the bottom surface facilitates the bending of side walls 110 during insertion of the routed parts into aperture 102. Secondary slot 116 and 118 can be utilized to receive after market routed parts for articles such as CD changers.

Several embodiments of the present invention have been disclosed; however, a worker of ordinary skill in the art would recognize that certain modifications come within the scope of this invention. For that reason, the following claims should be studied to determine the true scope and content of this invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A protector for installing a routed part in a vehicle comprising:
a protective body having opposed end walls and a surface extending between said end walls, with the body being trapezoidal in cross section and the body having a second surface that is opposed to and wider than the surface;
a central aperture formed in said body extending between said end walls for retaining a plurality of routed parts; and
a slot formed in said body extending from said surface to said aperture and extending between said end walls whereby said slot normally prevents removal of the routed parts from said aperture and said body is deformable to widen said slot to permit the routed parts to be inserted into and removed from said aperture.

2. The protector according to claim 1 including a strip of double-sided tape attached to said surface to prevent said slot from opening and for attaching said body to a vehicle panel.

3. The protector according to claim 1 including a strip of single sided tape attached to said surface and over said slot to prevent said slot from opening.

4. The protector according to claim 1 wherein said body has another surface and including at least one secondary aperture formed in said body extending between said end walls and at least one secondary slot extending between said another surface and said one secondary aperture.

5. The protector according to claim 1 wherein said aperture has a major diameter and a minor diameter, with said major diameter being greater than said minor diameter.

6. The protector according to claim 1 wherein said body has a pair of side walls extending between said end walls and including a groove formed in each of said side walls spaced from said surface to facilitate bending of said side walls to widen said slot.

7. A routed part assembly for use in a vehicle comprising:
a protective body having opposed end walls and a surface extending between said end walls;
a central aperture formed in said body extending between said end walls, said aperture disposed to receive a routed part;
a slot formed in said body extending from said surface to said aperture and extending between said end walls whereby said slot normally prevents removal of said routed part from said aperture and said body is deformable to widen said slot to permit said routed part to be inserted into and removed from said aperture;
mounting means abutting said surface and maintaining said slot closed; and
a vehicle panel, said body being mounted on said vehicle panel with said surface facing said vehicle panel.

8. The assembly according to claim 7 wherein said vehicle panel is a trim panel and said mounting means is a strip of double-sided tape attached to said surface and said trim panel.

9. The assembly according to claim 7 wherein said vehicle panel is a floor board and said mounting means is a ditch formed in said floor board and said surface abuts a bottom wall of said ditch.

10. The assembly according to claim 7 wherein the body has a pair of side walls extending between the end walls and including a groove formed in each of the side walls spaced from the surface to facilitate bending of the side walls to widen the slot.

11. The assembly according to claim 7 wherein the body has another surface and including at least one secondary aperture formed in the body extending between the end walls and at least one secondary slot extending between the another surface and the one secondary aperture.

12. A vehicle having a routed part assembly comprising:
a protective body having opposed end walls and a surface extending between said end walls;

a central aperture formed in said body extending between said end walls;

a routed part extending through said aperture;

a slot formed in said body extending from said surface to said aperture and extending between said end walls whereby said slot normally prevents removal of said routed part from said aperture and said body is deformable to widen said slot to permit said routed part to be inserted into and removed from said aperture; and a strip of tape attached to the surface and over the slot to prevent to prevent the slot from opening.

13. The vehicle according to claim 12 wherein the strip of tape attached to said surface preventing said slot from opening is a double sided tape.

14. The vehicle according to claim 12 wherein said body has a pair of side walls extending between said end walls and including a groove formed in each of said side walls spaced from said surface to facilitate bending of said side walls to widen said slot.

15. The vehicle according to claim 12 wherein the body has another surface and including at least one secondary aperture formed in the body extending between the end walls and at least one secondary slot extending between the another surface and the one secondary aperture.

16. A routed part assembly for receiving a routed part in a motor vehicle having a floor, said assembly comprising:

a ditch formed in said vehicle floor and having a bottom surface associated therewith;

a protective body having opposed end walls and a surface extending therebetween;

a central aperture formed in said body extending between said end walls;

said aperture disposed to receive a routed part, a slot formed in said body extending from said surface to said aperture whereby said slot normally prevents removal of the routed part from said aperture and said body is deformable to widen said slot to permit the routed part to be inserted into and removed from said aperture;

said ditch adapted for receiving said protective body such that said bottom surface of said ditch abuts said surface of said protective body.

17. The routed part assembly according to claim 16 wherein the body is trapezoidal in cross section and the surface is a bottom surface, the body having a top surface wider than the bottom surface.

18. The routed part assembly according to claim 16 wherein the body has another surface and including at least one secondary aperture formed in the body extending between the end walls and at least one secondary slot extending between the another surface and the one secondary aperture.

19. The routed part assembly according to claim 16 wherein the body has a pair of side walls extending between the end walls and including a groove formed in each of the side walls spaced from the surface to facilitate bending of the side walls to widen the slot.

* * * * *

UNITED STATES PATENT AND TRADEMARK OFFICE
CERTIFICATE OF CORRECTION

PATENT NO.    : 6,392,147 B1
DATED         : May 21, 2002
INVENTOR(S)   : Michael J. Hier et al.

It is certified that error appears in the above-identified patent and that said Letters Patent is hereby corrected as shown below:

<u>Title page,</u>
Item [73], Assignee, "Lear Corporation, Southfield, MI (US)" should read
-- Lear Corporation, Southfield, MI (US); DaimlerChrysler Corporation, Auburn Hills, MI (US) --.

Signed and Sealed this

Second Day of September, 2003

JAMES E. ROGAN
*Director of the United States Patent and Trademark Office*